United States Patent [19]

Pieper

[11] Patent Number: 4,932,035
[45] Date of Patent: Jun. 5, 1990

[54] DISCONTINUOUS GLASS MELTING FURNACE

[75] Inventor: Helmut Pieper, Lohr/Main, Fed. Rep. of Germany

[73] Assignee: Sorg GmbH & Co. KG, Lohr/Main, Fed. Rep. of Germany

[21] Appl. No.: 391,443

[22] Filed: Aug. 9, 1989

Related U.S. Application Data

[63] Continuation-in-part of Ser. No. 195,514, May 18, 1988.

[30] Foreign Application Priority Data

Feb. 2, 1989 [DE] Fed. Rep. of Germany ....... 3903016

[51] Int. Cl.⁵ .............................................. C03B 5/027
[52] U.S. Cl. ...................................................... 373/32
[58] Field of Search .............................. 373/27, 30–32, 373/33; 65/347, DIG. 4, 335, 135

[56] References Cited

U.S. PATENT DOCUMENTS

| | | | |
|---|---|---|---|
| 1,944,855 | 1/1934 | Wadman | 373/32 |
| 2,975,224 | 3/1961 | Burch | 373/32 |
| 3,160,692 | 12/1964 | Paxton | 373/32 |

*Primary Examiner*—Roy N. Envall, Jr.
*Attorney, Agent, or Firm*—Felfe & Lynch

[57] ABSTRACT

Furnace has a melting section into which batch is fed to a glass bath heated by electrodes, a homogenizing section, and a clarifying section therebetween in which fossil fuel burners heat the surface of the bath. The clarifying section is separated from the melting section by a first radiation shielding wall which extends to just above the bottom of the furnace and is interrupted by an opening above the glass for passage of combustion gases from the burners. A second shielding wall extends to above the surface of the bath and below the bottom margin of the opening in the first wall, so that combustion gases flow countercurrently through the incoming batch floating on the bath.

10 Claims, 5 Drawing Sheets

DISCONTINUOUS GLASS MELTING FURNACE

BACKGROUND OF THE INVENTION

This application is a continuation-in-part of U.S. application Ser. No. 195,514 filed May 18, 1988, and now U.S. Pat. No. 4,882,736 and incorporated herein by reference.

The invention relates to a glass melting furnace with a melting section, a homogenizing section and a clarifying section disposed between them, in which burners are disposed for supplying fossil energy, and between the clarifying section and the melting section a first radiation shielding wall reaching down to just above the furnace bottom is present.

Glass melting furnaces of this kind have long been known. They have the disadvantage, however, that, in the case of discontinuous operation, they either have to be maintained at a high temperature level by a high expenditure of energy, or after a period of time they require a certain cooling when they resume operation and a removal of glass in which the removed glass is of lesser value.

The known furnaces especially also have the disadvantage that, when constructed for low outputs, they have a poor efficiency, and the specific output, i.e., the amount of glass in proportion to the furnace capacity, is low.

SUMMARY OF THE INVENTION

It is now the object of the invention to create a glass melting furnace which is suitable especially for discontinuous operation, which has a high specific output, and which has a good efficiency heretofore unattained in small units.

The expense of construction is also to be low in proportion to performance, and the furnace is to make possible the immediate removal of workable glass even after idle periods. It is to produce glass of improved quality, and it is to be possible to use the raw materials for the batch in a wide range of batch components, i.e., their ratios to one another.

The furnace in accordance with the invention is furthermore to have a long useful life, so that its operation can be especially economical over time.

This object is achieved in accordance with the invention by the fact that the first radiation shielding wall has an opening for the passage of the combustion gases, the bottom edge of the opening being higher up than the bottom edge of a second radiation shielding wall disposed in the melting section.

For the reduction of radiation losses, the second radiation shielding wall extends to just above the batch material floating on the glass bath.

To be able to work heavily vaporizing glasses such as opal, lead and boron glasses, and to reduce radiation losses during idle time, a horizontal dividing wall is disposed advantageously between the glass bath and the burners, and can rest on a centrally disposed pedestal which also acts as a throttling insert.

It is especially advantageous toward lengthening the useful life of the furnace of the invention for the cover in the clarifying section to be situated substantially higher than in the melting section, and this can apply also to the burner-heated working tank and the homogenizing section.

The distance between the cover of the clarifying section or homogenizing section and the molten bath advantageously amounts to about three to four times the distance amounting to the greatest bath depth.

It is especially advantageous for the construction and operation of the furnace for the melting furnace to have a single housing and a continuous bottom, while the bath depth in the homogenizing section can be the same as the bath depth in the melting section.

DETAILED DESCRIPTION OF THE PREFERRED EMBODIMENT

Figure 1:
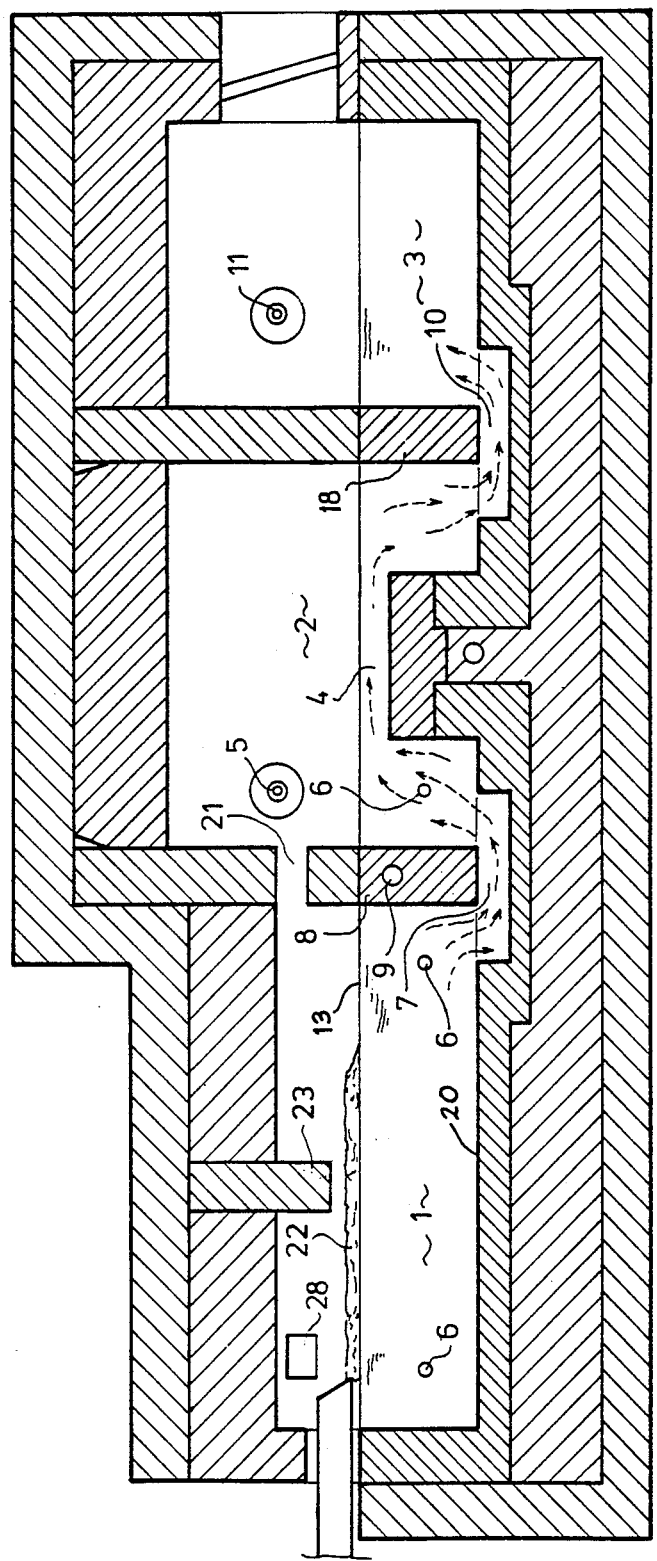
FIG. 1 a longitudinal section through the actual melting tank of an embodiment of the invention, FIG. 2 a top view of the tank in FIG. 1, FIG. 3 a longitudibal section through an embodiment that is suitable also for discontinuous withdrawal, FIG. 4 a horizontal section through the tank of FIG. 3 at the level of the surface of the glass bath, and FIG. 5 a section through the tank of FIGS. 3 and 4 above the surface of the glass bath.

As seen in FIGS. 1 to 5, the principle of the invention has three furnace and tank parts, one following the other in the direction of flow, the melting section 1 being followed in the direction of flow by the clarifying section 2, and this in turn by the homogenizing section 3. The highest temperature of the glass stream is found in an especially shallow part 4 of the clarifying section 2, where the heating can be provided both by the burners 5 and by electrodes 6. It is especially advantageous, however, if conventional energy which is relatively less expensive than electrical energy is introduced by means of burners, the complete raising of the glass bath to temperature being assured by the depth of the bath shallow part 4.

The uniformly heated glass therefore passes out of the area 4 into the homogenization section 3, in which it cools and flows down in a laminar flow without turbulence. The cooling assures that there will be no departure from the stratification of the glass, so that eddying is reliably prevented.

The batch 22 is loaded in at the front (rheologically speaking) end of the melting section 1, and is carried toward the clarifying section 2. Transport into the clarifying section, however, is prevented by a first radiation shielding wall or arch 8 with an underpass 7, the arch 8 extending to just above the furnace bottom 20 and forming a bottom passage for flow of molten glass from the melting section to the clarifying section. The arch 8 is preferably cooled by air which can be used later on as combustion air. The air is carried in ducts 9 of Inconel, for example, which is resistant to high heat.

After moving through the underpass 7 the glass, no longer mixed with the batch materials, flows upwardly in a laminar flow since here too the desired stratification is adjusted by the input of energy such that the coolest glass is on the bottm and the hottest on top. This temperature stratification here again causes a laminar flow without any turbulence. It assures that glass that has not been preheated will enter the actual clarifying zone and that glass already heated up will sink down again in the front portion of the clarifying section 2.

Figure 2:
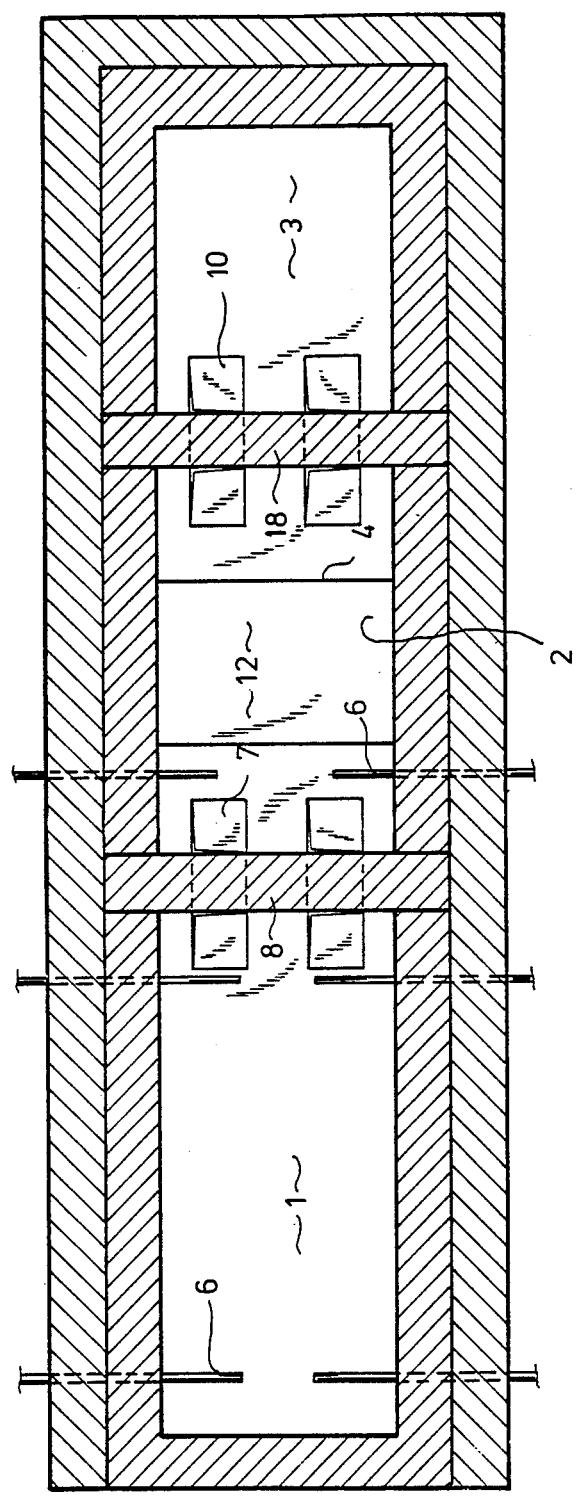

In FIGS. 1 and 2 is shown a simplified construction of the furnace wherein the heating in the melting section 1 is performed through electrodes 6. The batch 22 spreads out over a considerable part of the glass bath 13 in melting section 1. The molten glass then flows through an underpass 7 into the clarifying section 2 and is heated during its ascent by additional electrodes 6 and heated from the surface by one or more burners 5. Here, again, a laminar flow is created during the ascent and the glass reaches its highest temperature in area 4 in which the above-described shallow depth of the glass bath is situated.

The glass then moves in another laminar flow in the downstream portion of the clarifying section 2 to the additional bottom underpass 10 beneath a third radiation shield or arch 18 and from there into the homogenizing section 3 in which the losses and the desired adjustment of the temperature stratification can be compensated by the burners 11.

The radiation shields or arches 8 and 18 as well as the bottom of the clarifying section 2 can likewise be cooled by cool combustion air which is carried in ducts of refractory material.

Figure 3:
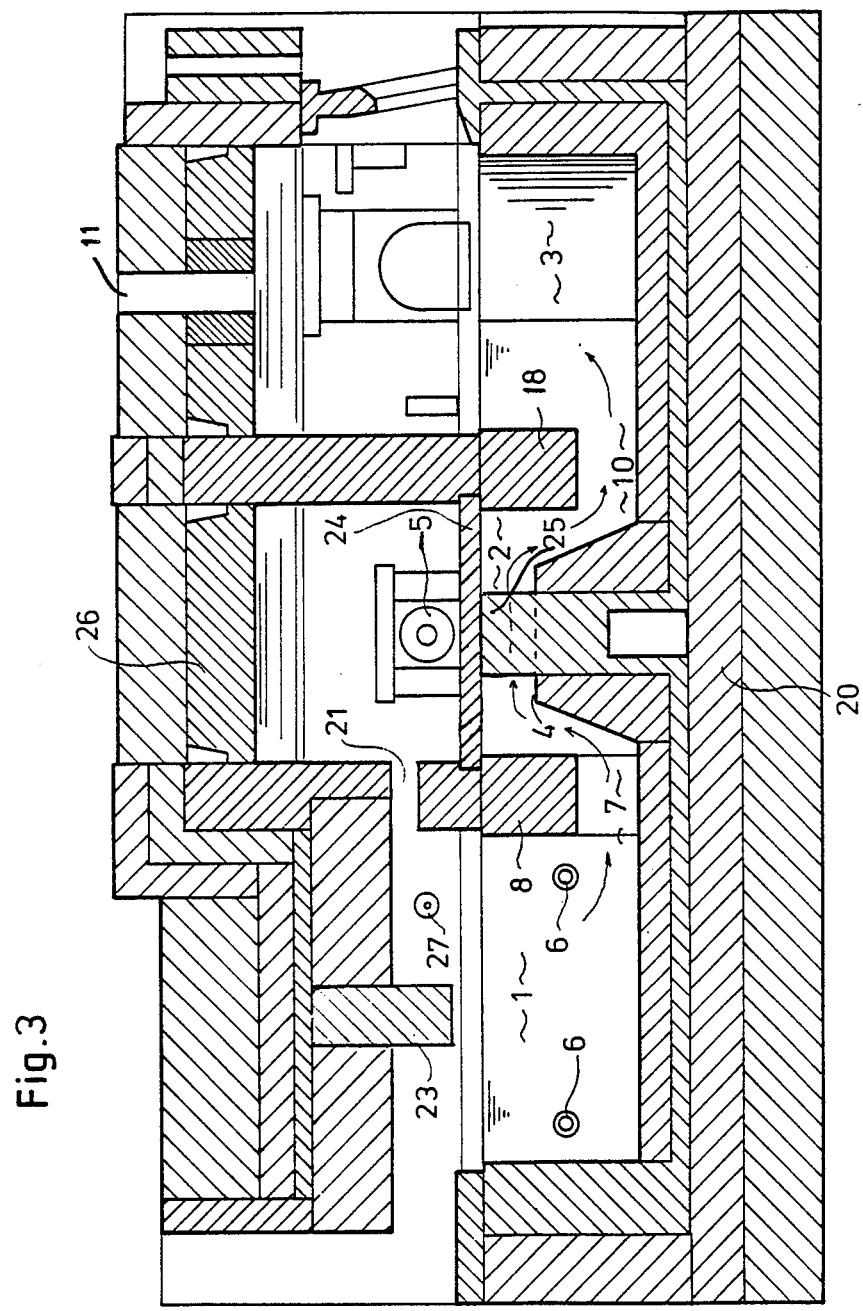
Figure 4:
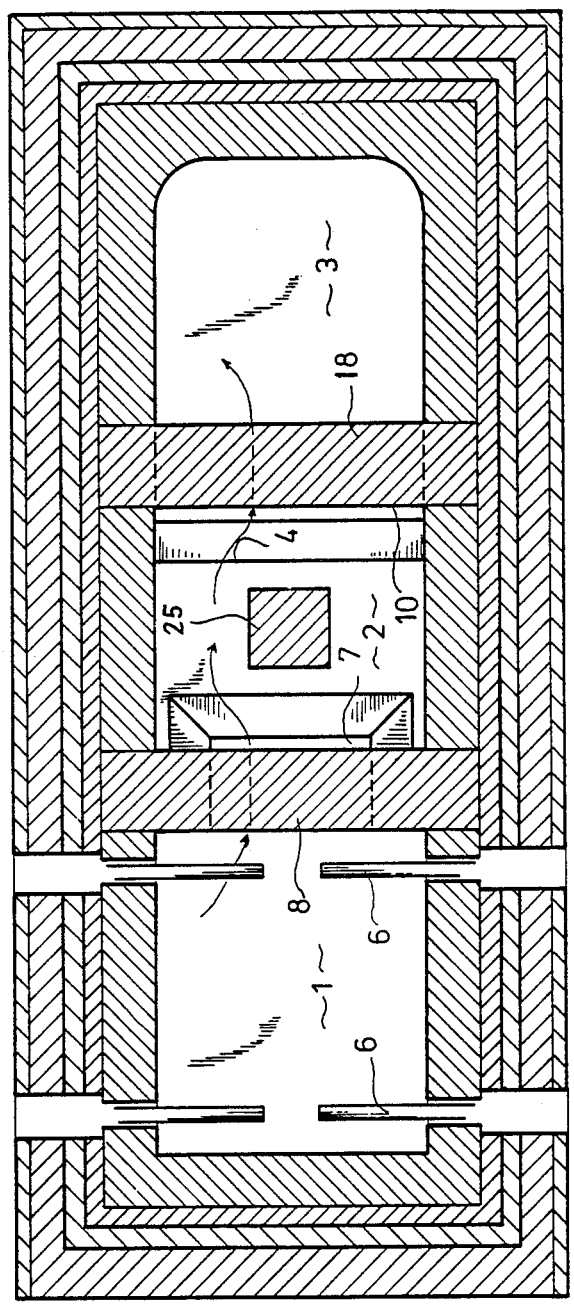
Figure 5:
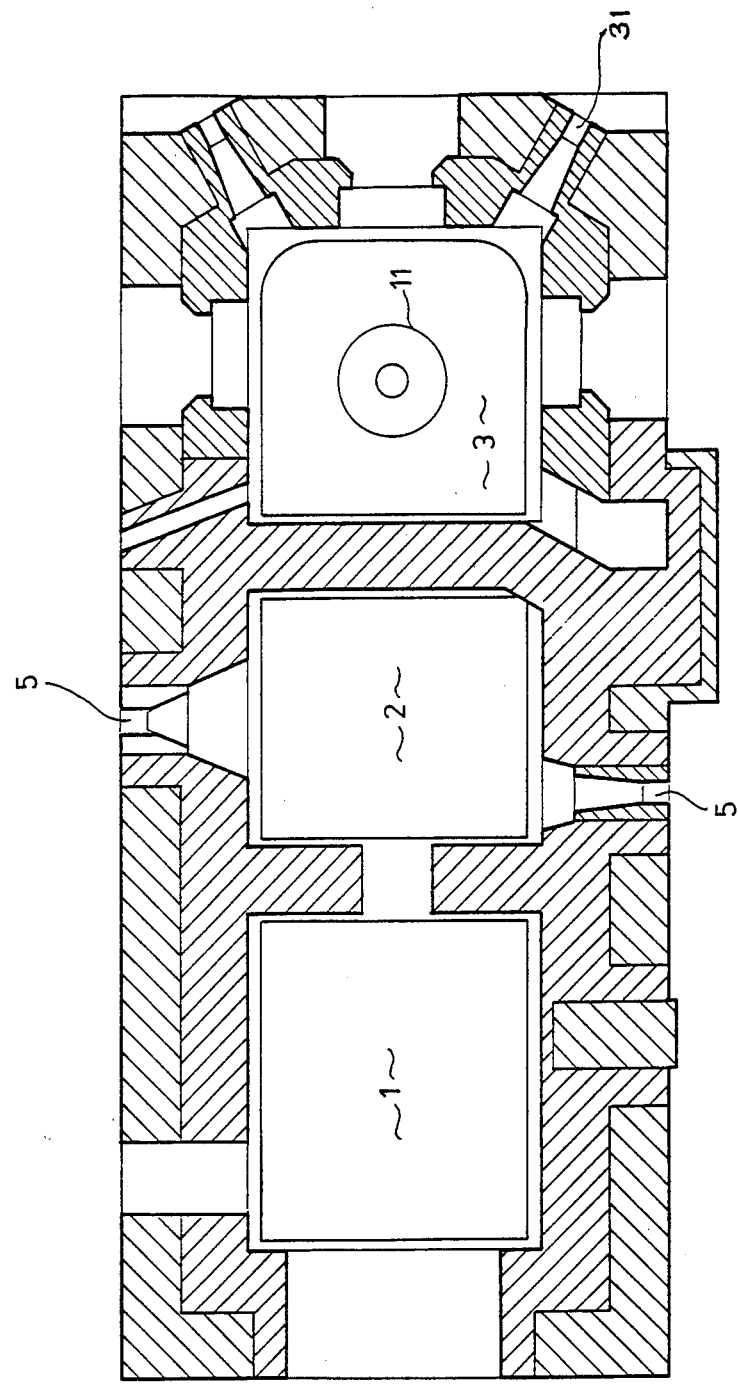

According to FIGS. 3 to 5, the melting of the batch in the melting section 1 is performed again by the input of electrical energy through electrodes 6 and first an upwardly directed laminar flow and then a downwardly directed laminar flow passes through the clarifying section 2, as described in connection with FIGS. 3 and 5. Now, however, the homogenizing section 3 is a preferably indirectly heated working tank with burners 11 and an indirect heating means.

In order to reliably prevent any back flow, even if there is no removal of glass from the homogenizing section or from the working tank, a pedestal 25 of refractory material is disposed in the clarifying section 2, which acts as throttling insert and divides the flowing glass into two parts and also does not permit any horizontal eddying. Since the desired temperature stratification without eddying is maintained even during standstill periods by the input of energy through the burners 5 in the clarifying section 2, this embodiment is especially suitable for furnaces from which molten glass is taken discontinuously. The indirect heating also assures that the desired temperature stratification within the homogenizing section 3 and the working tank will be sustained even if no molten glass is withdrawn. The temperatures therefore would be established in the desired manner even if there were no flow.

In the roof 26 of the melting section 1 there is disposed a second radiation shield 23 in the form of a vertical bulkhead, and an opening 21 is present in the first radiation shield 8, the bottom margin of the opening 21 being at a higher level than the bottom margin of the second radiation shield 23 which is just above the batch 22. This assures that the combustion gases can pass from the clarifying section 2 to the melting section 1, where they are then withdrawn through an opening 28 close to the batch feed opening. Thus they flow countercurrently over the batch 22 and heat it while they themselves are cooling. The efficiency of the glass melting furnace can thereby be decidedly improved.

In the center of the clarifying section 2 there is a pedestal 25 which on the one hand divides the flow and reliably prevents back flow, but on the other hand also serves as a support for a horizontal divider 24 which shields the burner section from the glass section of the clarifying section 2. The advantages thereby achievable have already been described in the introduction.

It is important that the roof 26 in the clarifying section be substantially higher than it is in the melting section 1. This brings it about that the roof 26 or upper furnace in the clarifying section 2 will not be too severely subjected to thermal stress, since this is the hottest part of the furnace, and in this manner a considerably longer life of the furnace is possible.

The roof in the homogenizing section and working tank 3 is at the level of the roof in the clarifying section 2 in order to achieve longer life in this area too. The distance between the roof 26 and the molten bath surface is about three to four times greater than the greatest bath depth. The latter, in turn, may not be too great in the homogenizing section or working tank 3, since if the tank depth is too great the glass becomes too cold at the bottom, and if it is too shallow the time of stay will not be enough for sufficient homogenization. A ceiling burner 11 and corner burners 31 provide additional heat for the surface of the bath in the working tank 3.

It is advantageous to the construction, and for the avoidance of heat losses, that the melting furnace is contained in a single housing and has a continuous bottom.

Thus, it is the essence of the invention to establish in the clarifying section 2 a definite temperature stratification with the avoidance of any turbulence, this being achieved also during the heating and the cooling, and in the maximum temperature area 4 due to the shallow bath depth, while at the same time an improved efficiency is achieved by the contrary flow of the batch 22 and the exhaust gas without substantial expense.

It is surprising that a substantial improvement of the efficiency can be achieved by the contrary flow of the batch and the exhaust, while the assurance is simultaneously provided by the first radiation shield 8 that no batch can flow into the clarifying section 2, and furthermore any back flow into the melting section 1 from the clarifying section 2 is also prevented, without impairing the exhaust gas guidance.

I claim:

1. Glass melting furnace with a melting section in which batch is added to a molten glass bath, a homogenizing section, and a clarifying section therebetween in which burners for the input of fossil energy are disposed, and between the clarifying section and the melting section a first radiation shielding wall extending to just above the furnace bottom to form an underpass for flow of molten glass between said melting section and said clarifying section, the first radiation shielding wall having an opening for the passage of the combustion gases, said furnace further comprising a second radiation shielding wall disposed in the melting section and having a bottom margin, the opening in said first shielding wall having a bottom margin which is above the bottom margin of said second shielding wall.

2. Glass melting furnace in accordance with claim 1, characterized in that the second radiation shielding wall extends to just above the batch floating on the glass bath.

3. Glass melting furnace in accordance with claim 2 characterized in that a pedestal is centrally disposed in the clarifying section and supports a horizontal dividing all between the glass bath and the burners.

4. Glass melting furnace in accordance with claim 1 further comprising a roof over clarifying section, which roof lies substantially higher than in the melting section.

5. Glass melting furnace in accordance with claim 4, characterized in that the distance of the roof from the molten bath is approximately 3 to 4 times as great as the greatest bath depth.

6. Glass melting furnace in accordance with claim 1, characterized in that the melting furnace is housed in one unit and has a continuous bottom.

7. Glass melting furnace in accordance with claim 1, characterized in that the homogenizing section serves as a working tank and has a bath depth corresponding to the melting section.

8. Glass melting furnace as in claim 1 further comprising a third radiation shielding wall between the clarifying section and the homogenization section, the third radiation shielding wall extending to just above the furnace bottom to form an additional underpass for flow of molten glass between the clarifying section and the homogenization section.

9. Glass melting furnace as in claim 1 wherein the first radiation shielding wall is made of refractory material and has cooling passages therethrough which carry combustion air destined for said burners.

10. Glass melting furnace as in claim 1 wherein the furnace bottom is shallowest in the clarifying section.

* * * * *